United States Patent Office 3,010,019
Patented Nov. 21, 1961

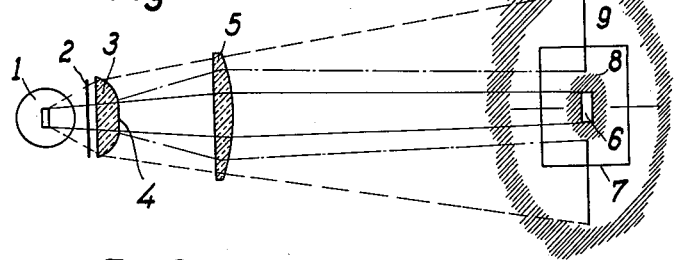
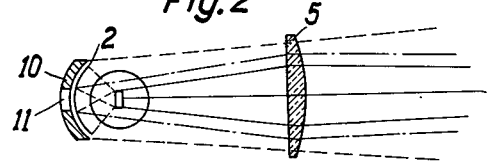
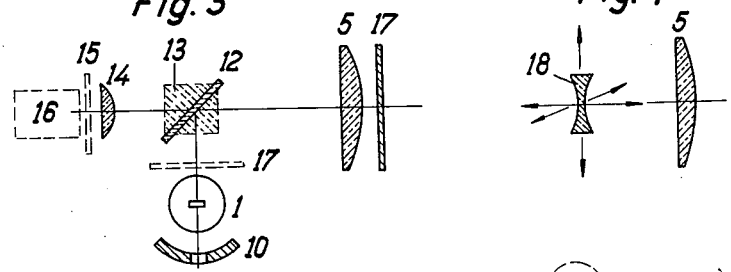
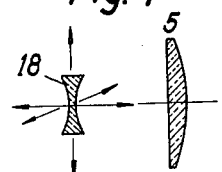
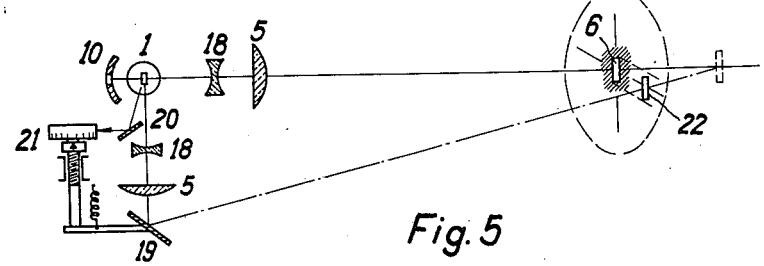
Inventor:
WALTER SOHST
ATTORNEYS

3,010,019
OPTICAL AIMING DEVICE
Walter Sohst, Klein Waabs, Eckernforde, Germany
Filed Nov. 5, 1959, Ser. No. 851,142
Claims priority, application Germany Nov. 10, 1958
8 Claims. (Cl. 250—83.3)

The invention relates to an instrument for aiming or directing cameras, telescopes, weapons and other appliances in darkness by means of light spots, dark fields and luminous fields, suitably with simultaneous range measurement and by the use of visible or invisible light, whereby adequate effects can be obtained even with relatively weak illumination of the target.

In darkness, the aiming of cameras or telescopes of weapons or other instruments on a particular point or object is attended by considerable difficulties. These difficulties are enhanced if the particular object must first be sought out. Such difficulties also persist if the object is illuminated by a source of light, such as a searchlight, since the locating marks in a scanning telescope are insufficiently distinguishable from the illuminated background. Neither are these difficulties eliminated by illuminating the locating of reference marks in already known manner; since such illumination disturbs the darkness adaptation of the observer's eye, and makes recognition of the object even more difficult. Instruments are already known which project the locating marks on the image of the object; as well as such which project the image of an incandescent filament of a light source on to the image of an object within an illuminated field. Such instruments fail in practice since projected images of reference marks are not visible on a dark object, and since a light spot projected on an illuminated field is insufficiently visible thereon, even if the illumination of the field is considerably attenuated; while the object of the illumination of the field, namely, to assist recognition of the target, is thereby nullified. These difficulties are further increased if aiming by invisible light, e.g. by infra-red radiation and an image converter is required.

The present invention is an instrument for aiming or directing photographic cameras, telescopes, weapons or other appliances in the dark by means of visible or invisible (infra-red) radiation, said instrument comprising a source of light, a ring condenser or condenser lens device and an objective lens, said objective lens being adapted alone to project an image of the light source on to a target, the said condenser lens device and said light source together being adapted to refract rays of light from the light source and produce a bright field on the target, and said condenser lens device having means producing a dark field on the target between said image and said bright field.

The invention not only enables rapid and easy aiming without eye-strain, but also requires only a moderate expenditure of technical means and a low illuminating performance. The instrument is suitable for aiming with visible and invisible, e.g. infra-red illumination; the latter in association with an image converter, incorporated in the instrument, or, alternatively, used separately, for instance in the form of spectacles, worn by the operator.

As will be known, a darkness-adapted eye requires only very low intensities of illumination, in order to be able to recognize objects. A light spot is easily recognisable against a background in the dark, even when its light is of very low intensity, e.g., only as bright as the light of the full moon (about ⅕ lux). Recognition is decisively improved if such a light spot is sharply defined against the surrounding darkness. Such a light spot is consequently suitable for the very accurate identification of any point on an object being viewed. It is not, however, suitable for identifying the boundaries or outline of an object, or for seeking an object. For this latter purpose, an illuminated field of considerable extent is required, according to the required scope of the search. Since, however, a light spot in an illuminated field is insufficiently distinguishable, even when its intensity of illumination is considerably greater than the intensity of illumination of the said illuminated field, it becomes necessary to separate the light spot from the illuminated field by an intervening dark zone. Only then is sufficient contrast obtained, and a solution afforded for the problem of seeking and finding an object in darkness and rapidly and accurately aiming at some point thereof.

The instrument forming the subject of the present application requires, for instance, at ranges between 30 and 50 metres, only the intensity of a pocket torch, say 1 to 3 watts; at 100 metres, about 10 watts, and at about 600 metres only about 150 watts. The manner of its construction and operation is such that the efficacy of the instrument is little diminished by rain, snow or light mist while a rain-spotted or misted objective lens only reduces the effective range.

The luminous field used for searching can be of circular or rectangular shape, according to requirements, and can further incorporate locating or reference marks.

It is likewise possible to use the lens system of a photographic camera, a telescope or a sighting telescope, or any other optical instrument to be aimed or ranged, in the capacity of a projection lens, the source of light being projected by a glass plate or a partially-silvered, double prism, into the path of the rays. This is the easiest way of obtaining parallax-free registering. The dimensions of the light spot, dark field or light field can be varied within fairly wide limits by suitable selection of the optical means used.

When the instrument is used in conjunction with a camera of long focal length, the lens system whereof is particularly sensitive to correct range setting, but also in many other cases, it may be found desirable to measure the range or distance from the object to be aimed at, i.e. the target. By supplementing the instrument with one or two auxiliary systems, but without using a condenser or a mirror, it can be converted into a range-finder or basis instrument with moving light spots. In this case, the moving light spots are produced by the source of light of the primary optical system, when, at the instant the light spots are in register, the luminosity of the principal light spot becomes intensified which is of advantage for the accuracy of measurement.

Embodiments of the invention will now be described, by way of example, with reference to the accompanying drawing, in which FIGS. 1 to 5 not only illustrate diagrammatically the essential means for the attainment of the effects hereinbefore described, but also show the further possibilities for developing and extending the scope of the principal purpose of the instrument: thus, for instance, the provision of a telephoto lens system, the negative image whereof is used for the adjustment of the instrument, and of a supplementary, second system, which can be used for range-measuring.

Referring to FIG. 1, a light source 1 has in front of it a ring condenser or condenser lens device 3 bearing reference or location marks 2 of any kind desired on its reverse side, and the convex surface whereof is provided with a flat surface 4 parallel to the surface of said reverse side. In front of this is the lens 5. The ring condenser 3 can also be built up of two or more lenses with plane-parallel faces. The plane-parallel face 4 can alternatively be replaced by a corresponding, negative (concave) face forming a telephoto system with the lens 5.

The light source 1 is on the one hand projected through the non-refracting face 4 by the lens 5 directly as a light spot 6 corresponding to the focal length of the lens 5. On the other hand, the same light source 1 is projected indirectly by suitably setting the ring condenser 3 in the form of a light field 9, corresponding in shape and size therewith and with the focal length of the lens 5; the locating marks 2 appearing as an image 7 within the light field 9. The non-refracting face 4 of the ring condenser is projected as a dark zone 8 concentrically to 6.

In FIG. 2, the ring condenser is replaced by a concave mirror 10, with a hole or a shutter 11, situated behind the light source 1. The concave mirror can be arranged to carry the location or reference marks 2 on its front surface. The outline shape of the light field 9 can be produced by correspondingly cutting the concave mirror 10. The manner of action of this system is the same as that represented in FIG. 1.

As shown in FIG. 3, the arrangement according to FIG. 1 or 2 is reflected by a plane-parallel, partially-silvered, glass plate 12 or a duplex prism 13 into the optical axis of a telescope, a photographic camera or any other optical instrument, the objective lens 5 of such apparatus being used as the projection lens. In this figure, the different possible uses are represented by a telescope eye piece 14, a photographic emulsion 15 and an image converter 16. In the last case, an infra-red filter is placed in front of the lens 5 or of the lamp. The infra-red filter 17 is shown in these different positions.

In FIG. 4, the lens 5 is converted by the addition of a biconcave lens 18 into a telephoto system. The telephoto lens system 18 can comprise one or two separate lens systems. Besides reducing the length of the apparatus, this enables the sharp-focus setting of the lens system to be obtained in known manner by moving the negative (concave) lens system 18 along the optical axis, without it being necessary to vary the length (of the arrangement). Additionally, however, by a displacement laterally and in height, across the optical axis, the light spot 6 produced by the system 1, 2 or 1, 18 can be moved sideways or up and down. This can be utilized to register a fixed aiming sight, without the use of mechanical adjustment, purely by optical means, on any required optical or sighting axis.

According to FIG. 5, the instrument is provided with a range-finding attachment. The lamp 1 of a system according to FIG. 1 or 2 projects through a second lens system 5, 18, but without a condenser or mirror, this beam producing by means of an angled mirror 19 a second light spot 22 in the direction of the principal system. The angled mirror 19 is pivoted and can be used to register the light spot 22 with the light spot 6 of the principal system. The rotation of the angled mirror 19 is performed in known manner by a measuring drum 21 which gives the range in metres. The light spot 22 can, however, also be displaced without moving the angled mirror 19, by shifting the negative element 18 of the telephoto lens system or by shifting the principal system transversely to the optical axis. The measuring drum or scale can be illuminated by a mirror 20 from the lamp 1. The measuring system can also be so arranged that by a second, opposed auxiliary system, two light spots are projected on either side of the principal light spot, travelling towards the latter, and registering simultaneously thereon. Further, the arrangement of one or two auxiliary systems increases the light intensity of the principal light spot 6 at the instant at which the light spots coincide.

I claim:

1. An instrument for aiming or directing photographic cameras, telescopes, weapons or other appliances in the dark by means of visible or invisible (infra-red) radiation, said instrument comprising a source of light, a condenser lens device and an objective lens, said lens receiving a non-refracted image of the light source and projecting it upon a target, said condenser lens device comprising means refracting rays of light from the light source and producing a bright field on the target of lesser intensity than said image, and means producing a dark field on the target between said image and said bright field.

2. An instrument in accordance with claim 1 in which the central part of the condenser lens device has plane-parallel faces.

3. An instrument in accordance with claim 1 in which the central part of the condenser lens device is concave to form a telephoto system with the objective lens.

4. An instrument in accordance with claim 1 in which the condenser lens device comprises a concave mirror arranged behind the source of light, and means shielding the central part of the mirror.

5. An instrument in accordance with claim 1 in which the condenser lens device is suitably dimensioned to form a bright field of a size corresponding to the field of view of the appliance to be aimed or directed.

6. An instrument in accordance with claim 1 in which the condenser lens device carries locating or reference marks which are visible on the bright field.

7. An instrument in accordance with claim 1 in which said lens is identical with the lens system of the appliance to be aimed, and a partially-silvered glass plate or a double prism is adapted to reflect into the optical axis the rays from the source of light passing through the condenser lens device.

8. An instrument in accordance with claim 1 in which the lens is a telephoto system which is movable transversely to the target into register with the aiming point of the appliance to be aimed or directed.

References Cited in the file of this patent

UNITED STATES PATENTS

| | | |
|---|---|---|
| 1,458,165 | Coblentz | June 12, 1923 |
| 2,431,625 | Tolson | Nov. 25, 1947 |
| 2,444,235 | Walker | June 29, 1948 |
| 2,557,096 | Golay | June 19, 1951 |